(12) United States Patent
Jager (10) Patent No.: US 6,557,334 B2
(45) Date of Patent: May 6, 2003

(54) CASTER MOUNTED REEL MOWER

(76) Inventor: Willem Jager, 1320 Rider Road, Breslau Ontario (CA), N0B 1M0

( * ) Notice: Subject to any disclaimer, the term of this patent is extended or adjusted under 35 U.S.C. 154(b) by 0 days.

(21) Appl. No.: 10/192,841

(22) Filed: Jul. 11, 2002

(65) Prior Publication Data

US 2003/0024225 A1 Feb. 6, 2003

(30) Foreign Application Priority Data

Jul. 13, 2001 (CA) ............................................. 2353030

(51) Int. Cl.⁷ ......................... A01D 34/53; A01D 34/52
(52) U.S. Cl. ........................................... 56/294; 56/249
(58) Field of Search ............................ 56/14.7, 7, 156, 56/249–254, 1, 294, DIG. 20

(56) References Cited

U.S. PATENT DOCUMENTS

| | | | | |
|---|---|---|---|---|
| 3,514,926 A | * | 6/1970 | Heth et al. ..................... 56/7 |
| 4,287,706 A | * | 9/1981 | Tobin, Jr. ........................ 56/7 |
| 5,623,817 A | * | 4/1997 | Bricko et al. ................... 56/7 |
| 6,098,388 A | * | 8/2000 | Davies ......................... 56/249 |

* cited by examiner

*Primary Examiner*—Robert E. Pezzuto
*Assistant Examiner*—Alicia Torres
(74) *Attorney, Agent, or Firm*—Riches, McKenzie & Herbert LLP (57) ABSTRACT

A mounting arrangement for a reel mower permitting the mower to roll over the ground in both a forward direction and a rear direction with the mower being drawn in the forward direction pivotable about a generally vertical caster axis forward relative the mower and with the mower being drawn in the rear direction rotatable about a generally vertical caster axis rearward relative the mower.

1 Claim, 8 Drawing Sheets

CASTER MOUNTED REEL MOWER

SCOPE OF THE INVENTION

This invention relates to reel mowers and, in particular, gang mowers for use with home garden tractors.

BACKGROUND OF THE INVENTION

Reel grass mowers are well known as, for example, manual push mowers with a pair of forward ground engaging wheels and a stabilizing rear roller to also engage the ground. The forward wheels are geared when moved forwardly to a rotatable reel carrying blades which rotate adjacent a cutting bar to cut grass. A user pushes the mower forwardly by a rigid handle.

Reel gang mowers are well known as used frequently on golf courses and other wide open areas requiring grass cutting. Reel gang mowers utilize a plurality of reel mowers moved together over the grass in an array which permits a swath of the cut to be as wide as desired having regard to the number of reels used. Gang mowers are recognized for their ability to mow a given area in a shorter period of time than that possible with rotary mowers having a cutting blade which rotates about a vertical axis.

Many known reel gang mowers suffer the disadvantage that they require relatively powerful tractors to move them.

Many known reel gang mowers suffer the disadvantage that they are only adapted to be moved in a forward direction. Typically, reel gang mowers are not capable of moving in a reverse direction as can be useful in repositioning the tractor and gang reel combination during normal use.

Many known reel gang mowers are coupled to the front of a tractor and pushed by the tractor. Such reel gang mowers typically suffer the disadvantage that the mowers cannot usefully be moved in a reverse direction and lifting mechanisms are provided to lift the gang mowers to move rearwardly and for repositioning. Such lifting mechanisms are complex and add costs.

Many known reel gang mowers are coupled to the rear of the tractor and drawn by the tractor by means of a hitch which pivots about a vertical axis relative the tractor. The present inventor has appreciated that such gang mowers suffer the disadvantage that they cannot be pushed in a reverse direction without difficulties in jackknifing as associated with a trailer. The jackknifing is of increasing difficulty to the extent that there is more than one effective hitch about which the mowers pivots relative the tractor.

Most known gang mowers suffer the disadvantage that they have relatively complex and heavy coupling systems and/or reel drive mechanisms which increase the cost of the mowers above that practical for homeowners.

Many known gang mowers suffer the disadvantage that they have difficulty in maintaining the front wheels of the mower in contact with the ground sufficiently to drive the cutting reel. Many mowers have the disadvantage of providing drive to the cutting reel independently of the front wheels as by hydraulic motors.

SUMMARY OF THE INVENTION

To at least partially overcome these disadvantages of known devices, the present invention provides a mounting arrangement for a reel mower permitting the mower to roll over the ground in both a forward direction and a rear direction with the mower being drawn in the forward direction pivotable about a generally vertical caster axis forward relative the mower and with the mower being drawn in the rear direction rotatable about a generally vertical caster axis rearward relative the mower.

An object of the present invention is to provide a mounting for a reel mower and, particularly, a reel mower in a gang, which permits the mower to roll on the ground both forwardly and rearwardly without jackknifing.

Another object is to provide an inexpensive reel mower construction.

Another object is to provide a mounting arrangement for a gang of reel mowers which provides for improved ground contact between the wheels of the mowers.

Another object is to provide a gang of reel mowers which can be used to mow grass with a minimal expenditure of energy as, for example, for use with an electrically powered, rechargeable tractor.

BRIEF DESCRIPTION OF THE DRAWINGS

Further aspects and advantages of the present invention will appear from the following drawings taken together with the accompanying description in which.

DETAILED DESCRIPTION OF THE DRAWINGS

Figure 1:
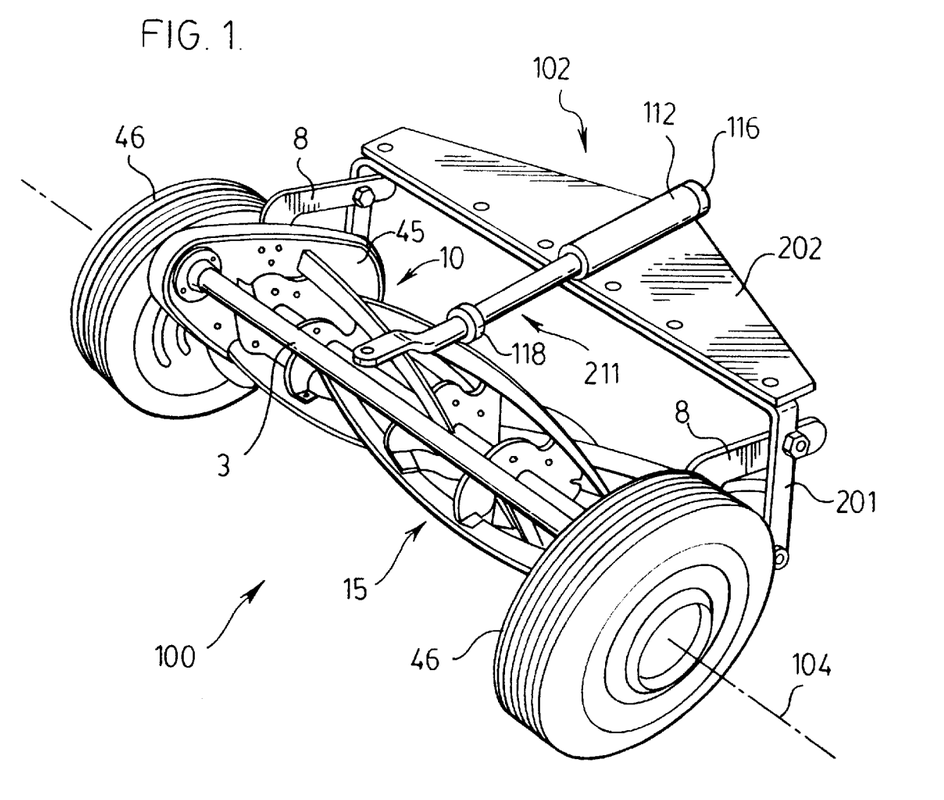
FIG. 1 is a pictorial view of a reel mower with a tow bar assembly in accordance with a first embodiment of this invention in a forward position for movement forwardly to cut grass.
Figure 7:
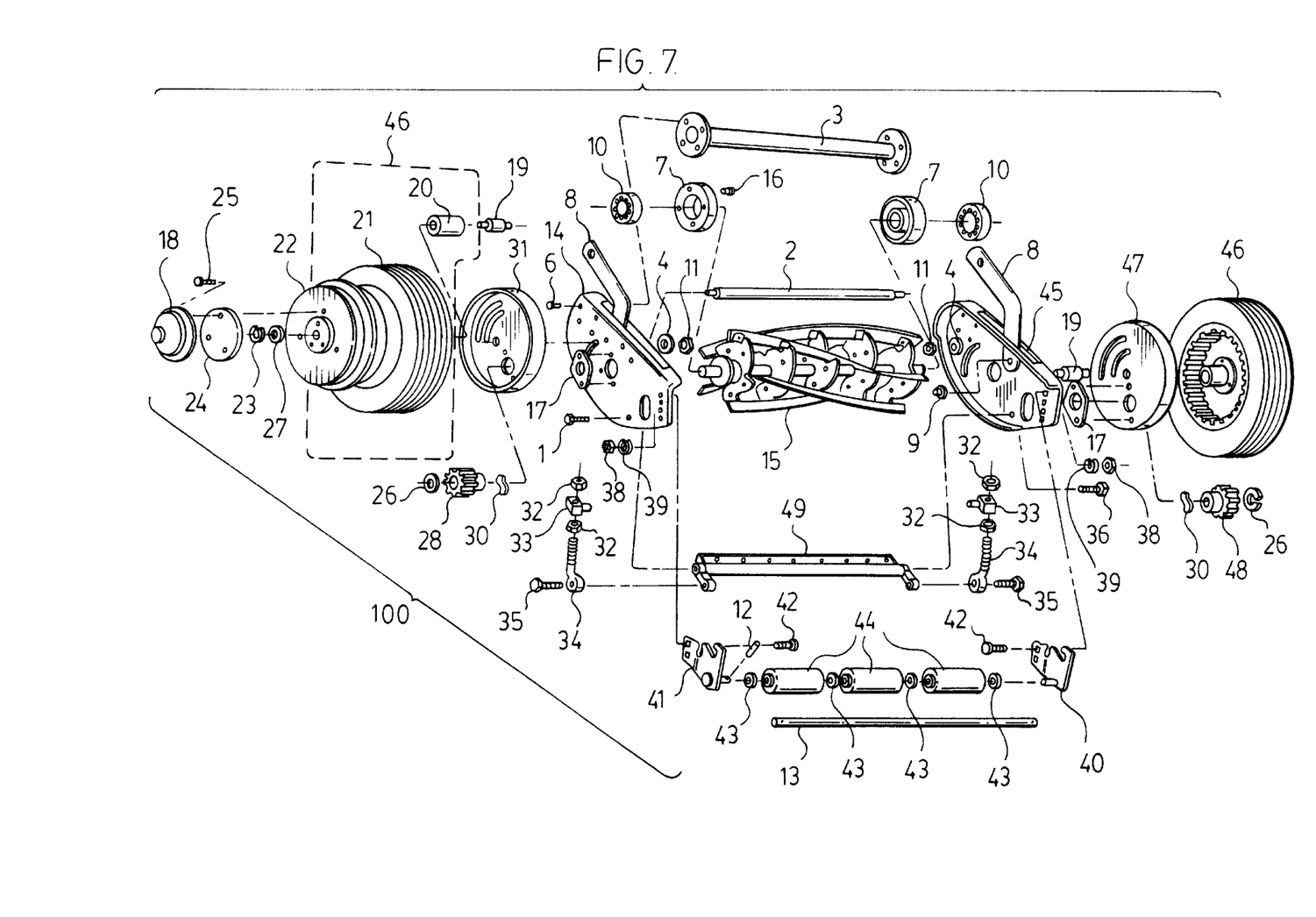
FIG. 7 is a pictorial schematic exploded view of the reel mower of FIG. 1.

Reference is made to FIG. 1 showing a reel mower generally indicated 100 to which a tow bar assembly 102 is secured. FIG. 7 shows the reel mower 100 in exploded view. The reel mower is preferably of the type commercially available from Agrifat of Sullivan, Ill. as a 21" Gang Reel Model No. 45-0194. The mower 100 has a rigid framework 10 comprising two spaced end plates 45 secured together in spaced relation notably by spacer tube 3 and cutter bar 49. Two ground engaging drive wheels 46 are journalled on their respective end plate 45 for rotation about a common wheel axis 104. Three ground engaging rollers 44 are located between the end plates 45 for rotation about a roller axis 106 parallel of the wheel axis 104 and rearward thereof. A reel 15 is located between the end plates 45 journalled for rotation about a reel axis 108 parallel the wheel axis 104. Each end of the reel is journalled to the end plates 45. The reel 15 is coupled via one-way pinion gear 48 to gearing teeth inside the hub of the driving wheels 46 such that rotation of the wheel 46 in a forward direction rotates reel 15, however, permitting relative rotation of the wheel 46 in the other direction the reel 15 unhindered. The reel 15 carries helical cutting blades which pass sufficiently close to a fixed, but adjustable, cutter bar 49 to cut grass caught therebetween.

Figure 8:
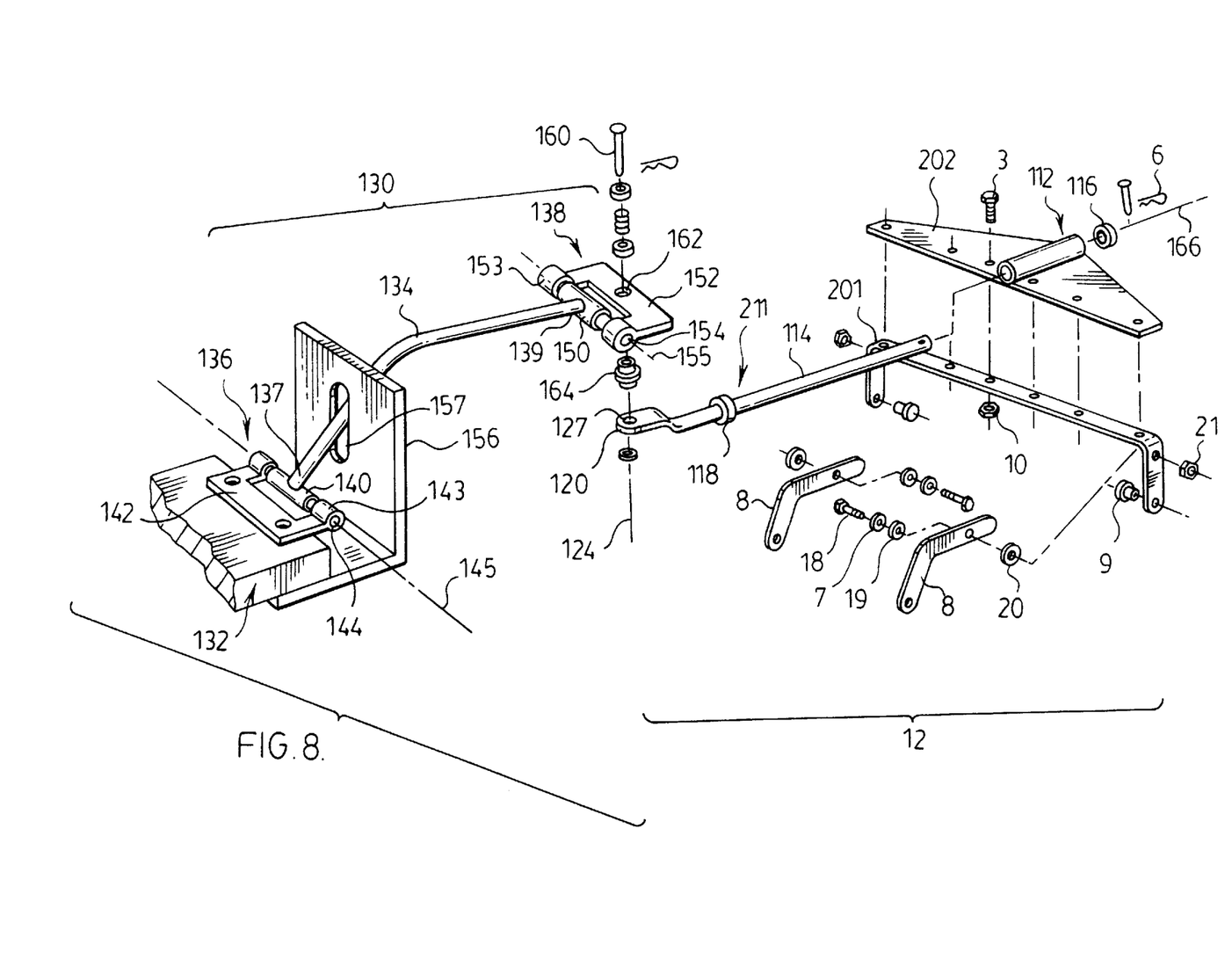
FIG. 8 is a pictorial schematic exploded view of the tow bar assembly for the mower of FIG. 1 together with a boom assembly.

The tow bar assembly 12 is shown in exploded view in FIG. 8 as a plate 202 fixedly secured to the framework 10 via a U-shaped bridge bracket 201 and two transit brackets 8. The bridge bracket 201 bridges between the end plates 45 towards the rear of the end plates 45 above the rollers 44. The bridge bracket 201 is secured by two transport brackets 8 secured at their forward ends to their respective end plates 45 and extending rearwardly with their rear ends fixed to the sides of the bridge bracket as by nut 9 and bolt 21.

Plate 202 carries a journal tube 112. Tow bar 211 has a cylindrical portion 114 between two slide stops 116 and 118 fixed to the cylindrical portion 114 against movement axially along the length of the tow bar 211.

The cylindrical portion 114 passes coaxially through journal tube 112 journalled for rotation therein about an axis 166 of the tube 112 and axially slidable therein between the stops 116 and 118. The tow bar 211 has a forward end 120 carrying an opening 122 disposed about a generally vertical pivot axis 124. The tow bar 211 extends longitudinally midway between the wheels 46.

Figure 3:
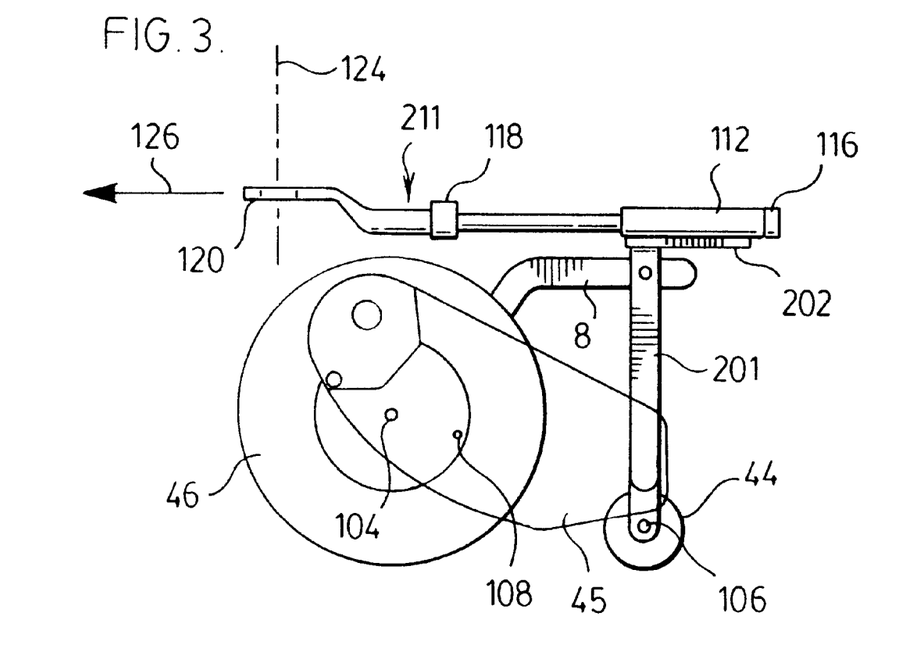
FIG. 3 is a schematic side view of the mower of FIG. 1.
Figure 5:
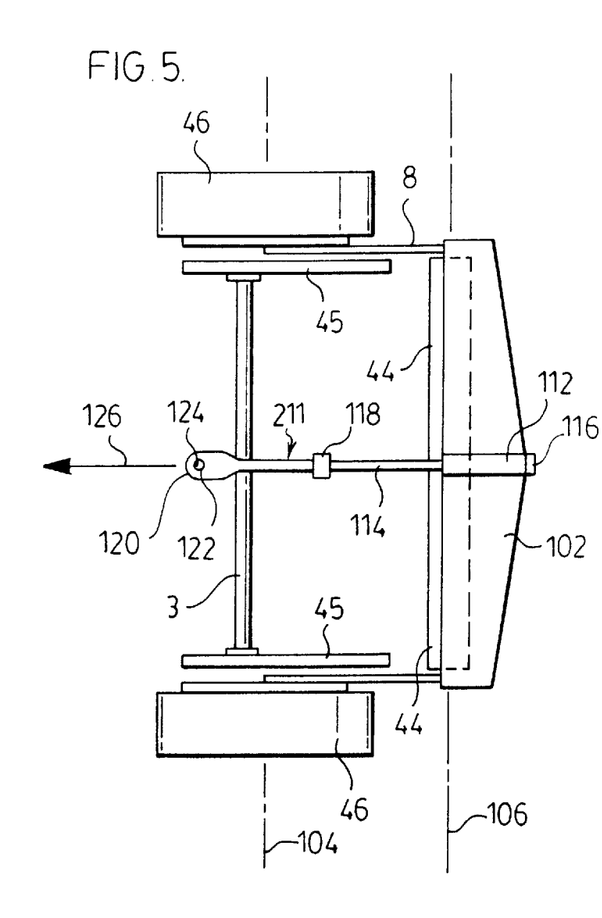
FIG. 5 is a schematic top view of the mower of FIG. 1.

FIGS. 1, 3 and 5 illustrate a forward position of the tow bar 211 when the tow bar 211 is drawn forwardly to urge the mower 10 in a forward direction as indicated by arrow 126. As seen, the cylindrical portion 114 has slid forwardly in tube 112 as limited by rear stop 116. This places forward end 120 of the tow bar with the axis 124 of the opening 122 in a forward position forward of the wheel axis 104 as seen in FIGS. 3 and 5. In this forward position, on applying forces to the forward end 120 of the tow bar via a coupling at the opening 122, which coupling permits rotation about pivot axis 124, the mower 100 will follow the opening 122 pivoting about the axis 124 in the manner of a caster with friction of the mower on the ground of the wheels 46 and rollers 44 tending to orientate the wheel axis 104 normal to the direction of forward movement of the pivot axis 124 at the front end of the tow bar.

Figure 2:
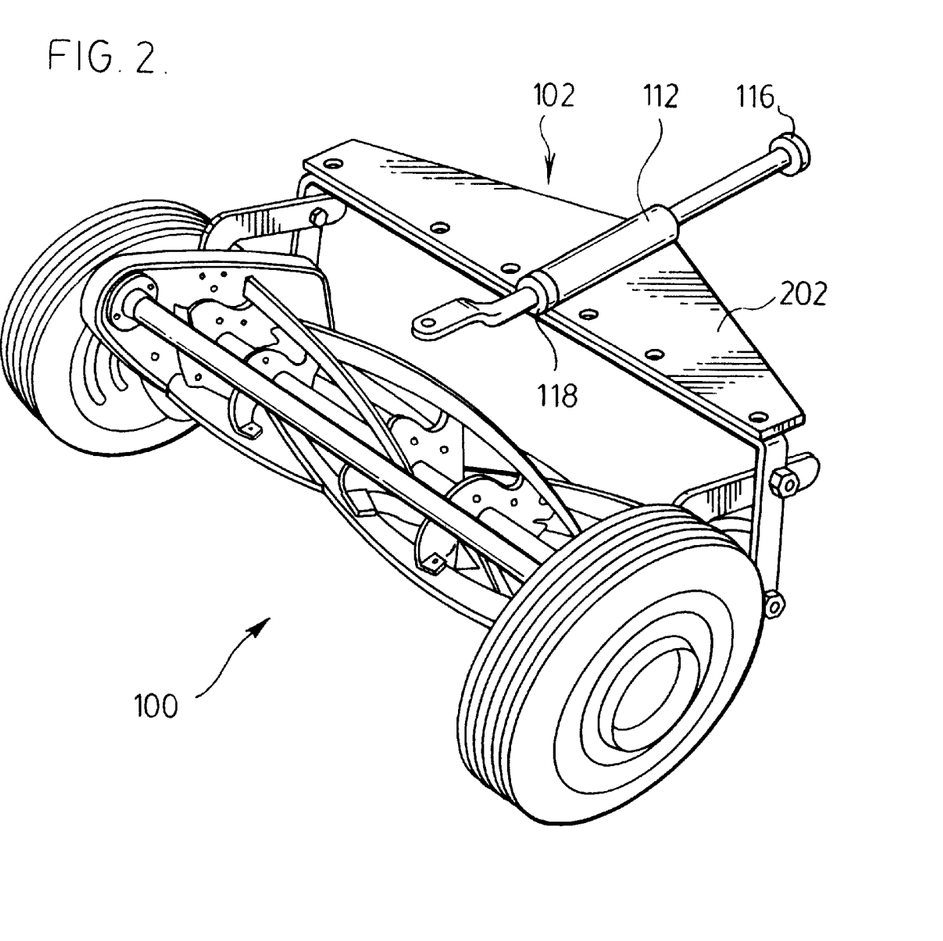
FIG. 2 is a pictorial view of the mower of FIG. 1 in a rear position for movement rearwardly.
Figure 4:
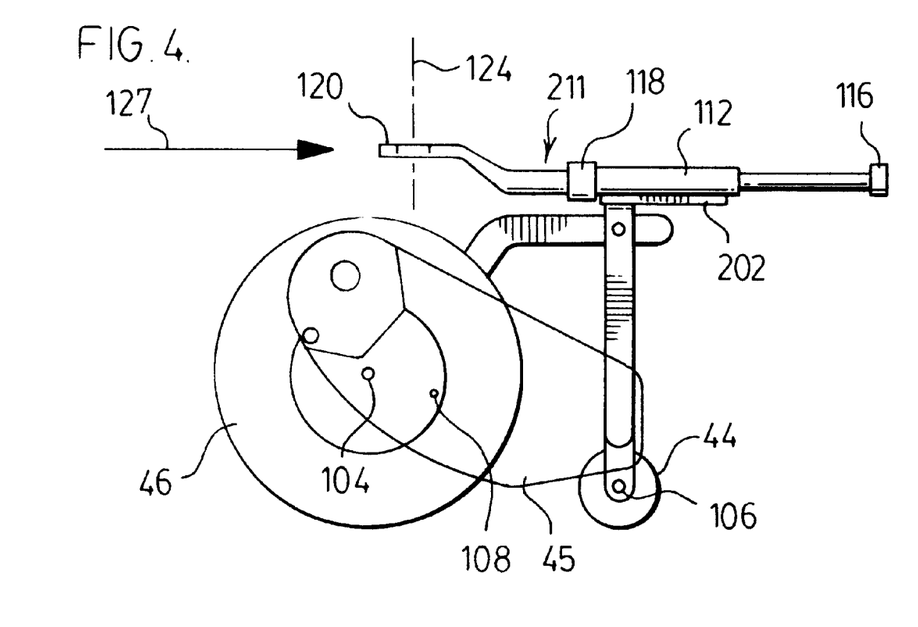
FIG. 4 is a schematic side view of the mower of FIG. 2.
Figure 6:
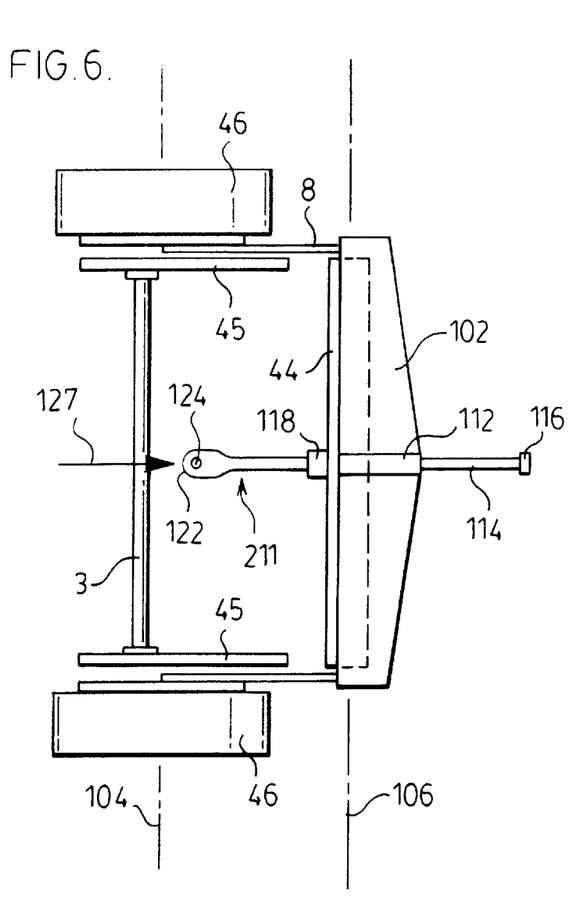
FIG. 6 is a schematic top view of the mower of FIG. 2.

FIGS. 2, 4 and 6 illustrate a rear position of the tow bar 211 when the tow bar is urged rearwardly relative the mower 100 in a rearward direction as indicated by arrows 127. As seen, cylindrical portion 114 has slid rearwardly in tube 112 as limited by forward stop 118. This places the forward end 12 of the tow bar with the axis 124 of the opening 122 in a rear position rear of the wheel axis 104 as seen in FIGS. 4 and 6. In this rear position, on applying forces to the forward end 122 of the tow bar via a coupling at the opening 112 which coupling permits rotation about axis 124, the mower 100 will follow the opening 122 pivoting about axis 124 in the manner of a caster with the friction of the mower on the ground of the wheels 46 and the roller 44 tending to orientate the wheels 104 normal to the direction of rearward movement of the pivot axis 124 at the front end of the tow bar.

The mower 100 has both the pair of wheels 46 and the rollers 44 which engage the ground. The engagement of the wheels 46 are dominant in the manner in which the mower 100 will follow the front end of the tow bar 211 and pivot about the axis 124 so as to orientate the wheel axis 104 normal to the direction the front end of the tow bar 211 is moved.

As seen in FIGS. 3 and 5 in the forward position, the pivot axis 124 is forward of the wheel axis 104. As a result on moving the forward end of the tow bar 211 forwardly, the wheels 46 are moved forwardly and will, due to rolling engagement with the ground, cause effectively equal resistance drag forces to forward movement at each wheel 46, which will result in the wheels 46 orientating the wheel axis 104 perpendicular to the direction in which the forward end of the tow bar is drawn forwardly. The rollers 4 are rearward of the wheels 46 and with the mower being moved forwardly, the wheels precede the rollers in the movement in the forward direction.

On moving the forward end of the tow bar 211 rearwardly, the wheels 46 are moved rearwardly and will, due to rolling engagement with the ground, cause effectively equal resistance.

As seen in FIGS. 4 and 6 in the rearward position, the pivot axis 124 is rearward of the wheel axis 104.

When the tow bar is rearwardly in the rear position of FIGS. 4 and 6, the pivot axis 124 is rearward of the wheel axis 104 sufficiently that on moving the front end of the tow bar rearwardly in the direction of arrow 127, the wheels 46 will follow the pivot axis 124 moving behind the pivot axis 124. On moving the forward end of the tow bar 211 rearwardly, the wheels 46 are moved rearwardly and will, due to rolling engagement with the ground, cause effectively equal resistance drag forces to rearward movement at each wheel 46, which will result in the wheels 46 orientating the wheel axis 104 perpendicular to the direction in which the forward end of the tow bar is drawn rearwardly. The rollers 44 continue to be rearward of the wheels 46 and with the mower being moved rearwardly, the rollers precede the wheels 46 in movement in the rearward direction.

The preferred embodiment provides for the pivot axis 124 to be in different locations depending on whether the mower is urged forwardly or rearwardly. Due to the lost motion linkage provided by front-to-rear sliding of the tow bar 211 in the journal tube 112, the location of the pivot axis 124 moves between the forward position in front of the wheel axis 104 to the rear position to the rear of the wheel axis 104 depending on whether the tow bar is urged forwardly or rearwardly. The mower will act as a caster to follow the pivot axis 124 with, at all times, the wheels 46 forward of the rollers 44, provided the pivot axis 124 is sufficiently forward for movement of the pivot axis 124 in the forward direction and provided the pivot axis 124 is sufficiently rearward for movement of the pivot axis 124 in the rearward direction.

For any given mower, by simple experiment, a person skilled in the art can determine locations of the pivot axis 124 suitable to permit the rollers 44 and wheels 46 to maintain their relative rearward and forward orientation as seen in FIG. 3 yet move forwardly drawn by the tow bar and act like a caster, that is, with the wheel axis 104 to assume an orientation normal the direction of forward movement of the pivot axis. It is to be appreciated that provided the pivot axis 124 is forward of the wheel axis 104 and, therefore, forward of both the wheel axis 104 and the roller axis 106, that the desired castering effect will be achieved with forward movement. To some extent, having the pivot axis 124 forward of the wheel axis 104 as far as possible, provides advantageous castering. The present inventor has appreciated that the pivot axis 124 need not be forward of the wheel axis 104 and that with known mowers as shown, provided the pivot axis is at the wheel axis 104 or slightly rearward thereof between the wheel axis 104 and the roller axis 106, the desired castering results during forward movement.

For any given mower, by simple experiment, a person skilled in the art can determine locations of the pivot axis 124 suitable to permit the roller 44 and wheels 46 to maintain their relative rearward and forward orientation as seen in FIG. 4 yet move rearwardly pushed by the tow bar and act like a caster, that is, with the wheel axis 104 to assume an orientation normal the direction of rearward movement of the pivot axis. It is to be appreciated that provided the pivot axis 124 is rearward of the roller axis 106 and, therefore, rearward of both the wheel axis 104 and the roller axis 106, that the desired castering effect is achieved for rearward movement. To some extent, having the pivot axis 124 as far rearward of the roller axis 106 as possible, provides advantageous castering. The present inventor has appreciated that the pivot axis 124 need not be rearward of the roller axis 106 and that with known mowers as shown having the pivot axis 124 between the roller axis 106 and the wheel axis 104 preferably at least rearward of the wheel axis 104 can provide the desired castering on rearward movement.

Figure 9:
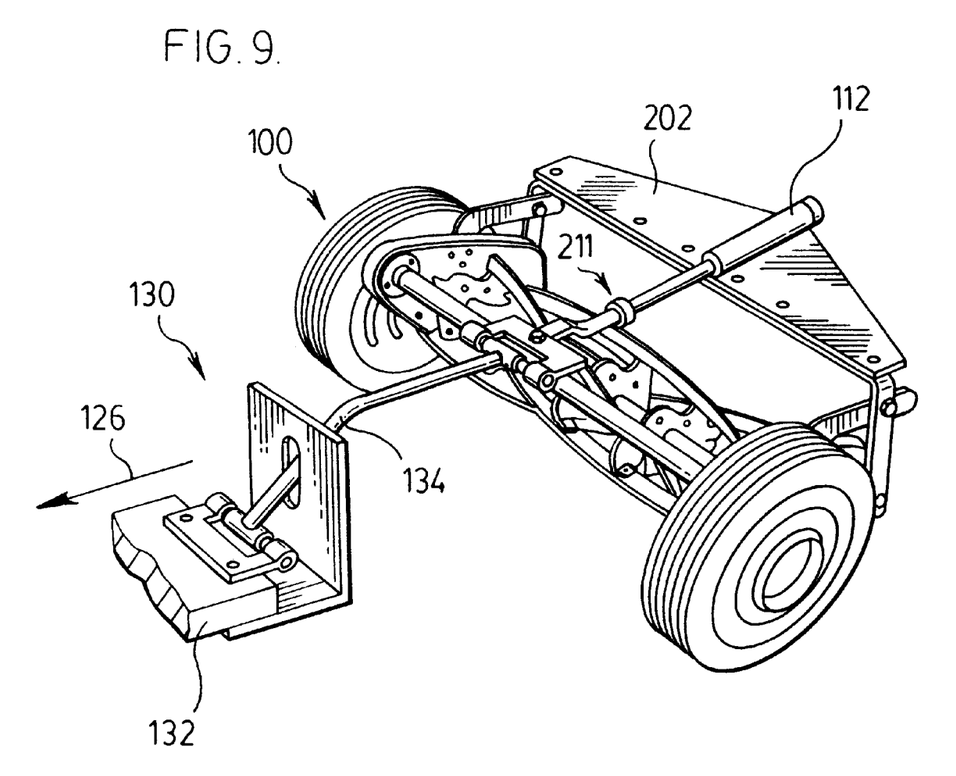
FIG. 9 is a pictorial view of the mower of FIG. 1 coupled to a rear hitch plate of a tractor with a boom assembly and tow coupling as shown in FIG. 8.

Reference is made to FIGS. 8 and 9 which show a boom assembly generally designated 130 for coupling the tow bar 211 to a vehicle, such as a garden tractor (not shown) to move the mower. FIG. 8 shows as 132 a hitch plate secured to a frame of the garden tractor (not shown) at the rear of the tractor to which the boom assembly 130 is attached in a manner that the tractor and its plate 132 is forward of the mower and precedes the mower in moving forwardly. The boom assembly 130 has a tubular boom rod 134 carrying a forward hinge 136 at a front end 137 and a rear hinge 138 at a rear end 139.

The front hinge 136 comprises a hollow cylindrical journal tube 140 welded to the boom rod 134. A hinge plate 142 is fixedly secured to the frame 132 of the garden tractor. The hinge plate 142 has two ears 143 to receive a hinge pin 144 secured to extend between the ears 143 and coaxially through the journal tube 140. The journal tube 140 pivots relative the hinge plate 142 about front hinge axis 145.

The rear hinge 138 has a similar construction with a hollow cylindrical journal tube 150 welded to boom rod 134. A hinge plate 152 has two ears 153 to receive a hinge pin 154 secured to extend between the ears 153 and coaxially through the journal tube 150. The journal tube 150 pivots relative the hinge plate 152 about rear hinge axis 155. The front hinge axis 145 and rear hinge axis 155 are parallel and horizontal.

To limit the extent to which the boom rod 134 can pivot about front hinge axis 145, an L-shaped bracket 156 is secured to the tractor hitch plate 132 and has an elongate vertical slot 157. Engagement of the boom rod 134 on the upper and lower ends of the slot sets the highest and lowest elevations to which the boom rod 134 can pivot relative front hinge 136.

The boom rod 134 is fixed against side-to-side movement and merely moves pivoting about the front hinge 136 in a vertical plane.

The forward end 120 of the tow bar 211 is coupled to the rear hinge plate 152 via a pivot pin 160 passing coaxially through a vertical opening 162 in the rear hinge plate 152 and the vertical opening 122 with a bearing sleeve 164 therebetween to couple the front end 120 of the tow bar to the rear hinge plate 152 for relative pivoting about pivot axis 124.

The coupling of the boom rod 134 to the mower plate 202 is effectively a universal joint coupling with freedom of movement about three axes, namely, rear hinge axis 155, pivot axis 124 and journal tube axis 166, each substantially perpendicular to the other two.

Reference is made to FIG. 9 which is a pictorial view of the boom assembly 130 of FIG. 8 used to couple the mower to a rear trailer hitch plate 132 of a tractor (not shown) and drawing the mower forwardly with the tow bar 211 in the forward position. In FIG. 9, the mower 100 is behind the tractor.

The mower is moved forwardly by the tow bar in the forward position as seen in FIGS. 1, 3 and 5 with wheels 46 forward of rollers 44 castering about pivot axis 124 of the tractor.

With the configuration of FIGS. 8 and 9, with rear movement of the tractor, the boom rod 134 will initially urge the tow bar 211 to slide relative the tube 112 to a rear position as shown in FIGS. 4 and 6. As the boom rod 134 cannot move side-to-side and with the tow bar and mower in the rear position of FIGS. 2, 4 and 6, with rear movement of the tractor, the mower merely moves rearwardly with the wheels 46 forward of the rollers 44 castering about pivot axis 124. That is, the rollers 44 precede the wheels 46 moving rearwardly.

Figure 10:
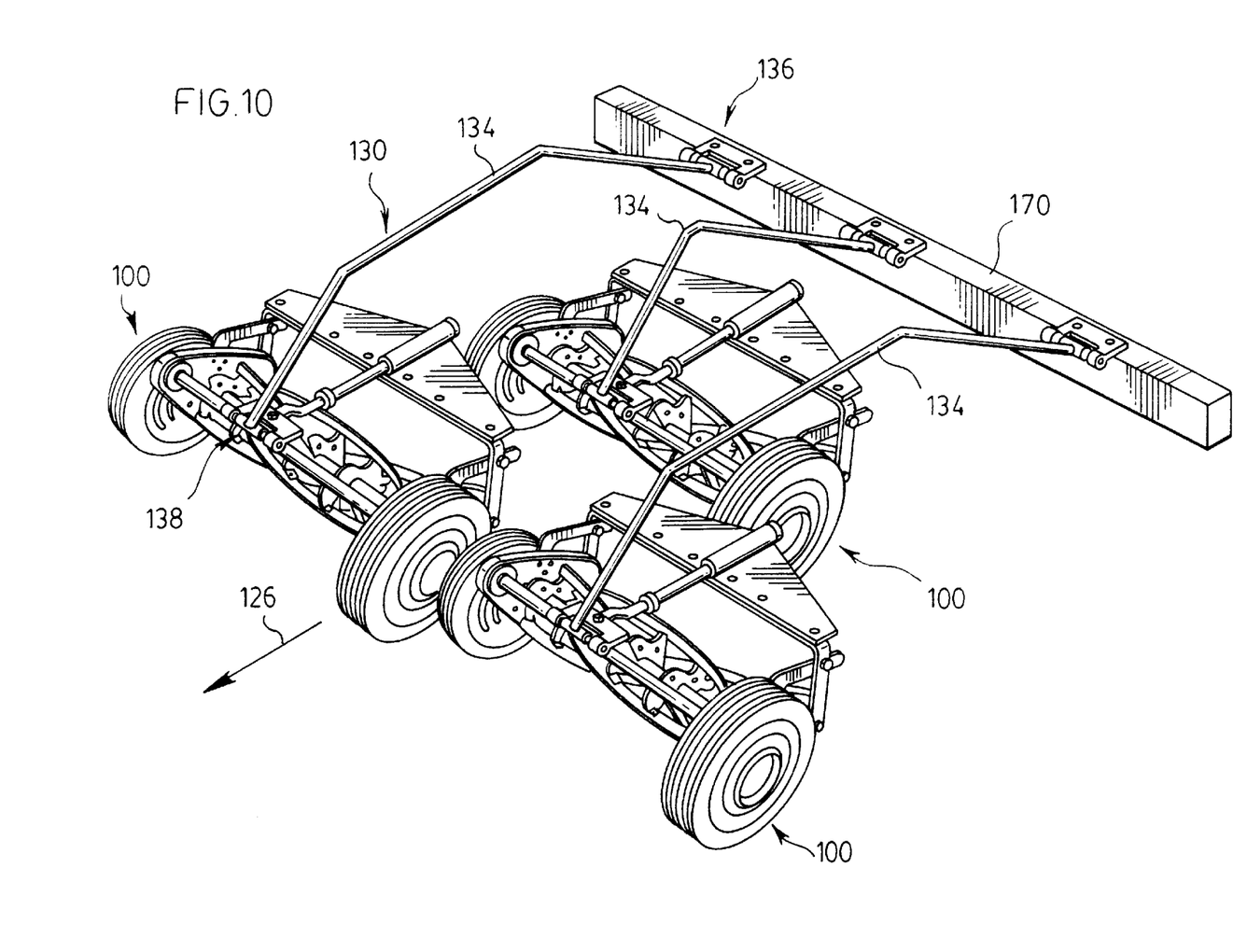
FIG. 10 is a pictorial view of a gang of three mowers shown in FIG. 1 coupled to a front bumper of a tractor with a boom assembly and tow coupling similar to that shown in FIG. 8.

Reference is made to FIG. 10 showing a gang of identical mowers 100 coupled to a front bumper 170 of a tractor (not shown) with the mowers ahead of the tractor with the tractor bumper pushing the mowers forwardly with the tow bars 211 in the forward position. The boom assemblies 130, shown in FIG. 10, are similar to that in FIG. 7, however, extend from the hinge 138 rearwardly to the hinge 136 fixed to the front bumper 170. The boom tubes 134 for the two forwardmost mowers have a greater length than the boom 134 for the single rearward mower. Each boom tube 134 is fixed to the bumper 170 against side-to-side movement and each mower will follow its respective pivot axis 124 maintaining spacing of the mowers at all times.

While a gang of three mowers is shown in a staggered configuration, almost any number of mowers can be ganged at various relative locations to the tractor as by comparable booms, whether to the front, to the rear or to the sides of the tractor.

Whether the mowers are in front of the tractor as in FIG. 10 or behind the tractor as in FIG. 9, the mowers are moved forwardly in the forward position, as shown in FIG. 1, to cut grass following their pivot axis 124. When moved rearwardly by the tractor moving rearwardly, each mower assumes a rear position as shown in FIG. 2 and move rearwardly following their pivot axis 124 with the wheels 46 continuing to be forward of the rollers 44.

In each of FIGS. 1 to 10, the wheels 46 are forward of the rollers 44 with the forward direction being towards the right-hand side of the drawings are viewed and the rearward direction being towards the left-hand side as the drawings are viewed.

The bracket 156 and its slot 157 permit the boom rod 134 to move with the limited vertical movement of the boom rod 134. The limits to vertical movement are selected to prevent, for reasonable terrain, the tow bar 211 from engaging the ground.

Having limited vertical movement of the boom rod 134 is advantageous when moving forwardly or rearwardly to limit the front to rear positions the mowers may assume. Preferably, mechanisms are provided to limit relative rotation about each of axis 145, 155, 124 and 166.

FIGS. 8 to 10 illustrate one form of a coupling to couple the tractor frame, i.e. hitch plate 132 or bumper 176 to the mower framework. The embodiments illustrated provide a universal joint coupling with rotation about three normal axes 124, 155 and 166. Other forms of universal couplings may be used. The universal coupling locates in a central vertical plane centered between the wheels 46. The universal coupling provides for effective pivoting about a castering axis having a substantial vertical component. The coupling is movable to a forward position on forward movement and movable to a rear position on rearward movement. In the forward position, the universal coupling provides a castering axis sufficiently forward relative the axis of the wheels 46 for the wheels 46 to caster tracking the castering axis and preceded by the rollers.

In the preferred embodiment, movement of the pivot axis 122 between the forward and rear positions is accomplished by a lock link sliding mechanism. Other lock link mechanisms can be provided including a pivot coupling in which a lever arm swings to a different angular location on rear movement than an angular location it assumes on forward movement with the different angular orientation representing different relative forward and rear positions as relative the mower framework.

While the invention has been described with reference to preferred embodiments, many modifications and variations will now occur to persons skilled in the art. For a definition of the invention, reference is made to the appended claims.

I claim:

1. A mounting for a reel mower, the reel mower having a rigid framework carrying:
 a pair of ground engaging forward wheels rotatably disposed about a wheel axis,
 a ground engaging roller rearward of the wheels and disposed about a roller axis parallel the wheel axis, and
 a grass cutting reel between the wheels rotatable about a reel axis generally parallel the wheel axis for cutting grass, the framework carrying a caster pivot coupling mechanism adapted for transfer of forces from a vehicle to move the mower to the framework, the pivot coupling mechanism permitting pivoting of the framework about a pivot axis having a substantial vertical component thereto, the pivot axis disposed in a central plane normal the wheel axis centered between the wheels, the pivot coupling mounted to the framework for moving in the central plane between a forward position and a rear position, the pivot coupling assuming the forward position when the coupling mechanism is moved forwardly, the pivot coupling assuming the rear position when the coupling mechanism is moved rearwardly, the forward position located sufficiently forwardly relative the wheel axis that in the forward position on forward movement of the pivot coupling, the mower following the pivot axis with frictional drag of the mower on the ground biasing the mower to pivot about the pivot axis to assume an orientation with the axis of the wheels normal the pivot axis and with the wheels to be maintained forward of the roller such that the wheels precede the roller as the mower moves forwardly, the rear position located sufficiently rearward relative the wheel axis that in the rear position on rearward movement of the pivot coupling, the mower following the pivot axis with frictional drag of the mower on the ground biasing the mower to pivot about the pivot axis to assume an orientation with the axis of the wheels normal to the pivot axis and with the wheels maintained forward of the roller such that the rollers precede the wheels as the mower moves rearwardly.

\* \* \* \* \*